Patented Apr. 16, 1940

2,197,458

UNITED STATES PATENT OFFICE 2,197,458

PROCESS FOR PRODUCING COLORING MATTERS OF THE PHTHALOCYANINE SERIES

Max Wyler, Blackley, Manchester, England, assignor to Imperial Chemical Industries Limited, a corporation of Great Britain No Drawing. Application July 10, 1936, Serial No. 90,008. In Great Britain July 10, 1935

11 Claims. (Cl. 260—314)

This invention relates to processes for producing coloring matters of the phthalocyanine series.

It is an object of this invention to provide an improved process for producing metal phthalocyanines from readily accessible starting materials. It is a further object of this invention to improve the process of production of metal phthalocyanines according to British specification No. 322,169, whereby the desired products are obtained in higher yields and with greater facility. A still further object of our invention is to improve the process essentially described in British Patent No. 322,169, whereby the same may be extended to the production of compounds to which it was not applicable heretofore, or which could be produced by said process in unsatisfactory yields only. Other and further important objects of this invention will appear as the description proceeds.

In British Patent No. 322,169 a process is described for reacting with ammonia or certain primary monoamines on phthalic anhydride, phthalimide, or the mono or diamide of phthalic acid in the presence of iron, nickel, or copper, as metals or compounds, to give substances useful as coloring matters.

The compounds obtained are now known to be members of a class of compounds conveniently named phthalocyanines (Linstead and others, Journal of the Chemical Society, 1934, 1016–1039), and the particular compounds of British Patent No. 322,169 are accordingly to be named iron, nickel and copper phthalocyanines respectively. It is also said in British Patent No. 322,169 that both before and after treatment with sulphuric acid or oleum these compounds may be used as coloring matters, for example, in padding, printing and pigmenting. It is now known (Linstead and others, loc. cit., and see also other British patents referred to below) that when the treatment of iron, nickel and copper phthalocyanines is with sulphuric acid (i. e., of 98% or thereabouts) then it consists in simple solution of the compound, which is reprecipitated when the solution is diluted with water. But treatment with oleum (see British Patent No. 322,169) brings about sulphonation.

In British Patent No. 390,149 the process of British Patent No. 322,169 was in part extended to the use also of magnesium and antimony, and it was shown that a magnesium phthalocyanine could thus be obtained, which differed from the iron, nickel and copper phthalocyanines described in British Patent No. 322,169 in that when it was dissolved in sulphuric acid and the solution was poured into water the magnesium was removed, and a metal-free compound was obtained. The same metal free compound, conveniently known (Linstead and others, loc. cit.) as phthalocyanine, was obtained by use of antimony, which may act as a catalyst or may form an antimony phthalocyanine. The metal-free phthalocyanine is described in British Patent No. 390,149 as having value as a pigment, which can be made into a lake with blanc-fixe alumina and so used as a coloring matter in lithographic ink. Magnesium phthalocyanines from 4-chlorophthalimide, 3,4-dichlorophthalimide, 3,6-dichlorophthalimide, and 4-nitrophthalimide are described, and certain corresponding metal-free phthalocyanines (namely, from the 3,4- and 3,6-dichloro-, and 4-nitrophthalimides) are also briefly described.

In British Patent No. 389,842 a process is described for making phthalocyanines by heating an orthocyanoarylcarboxylic amide in the presence of a metal or metal compound. The metals mentioned include chromium, cobalt, copper, iron, magnesium, nickel, and tin. Aluminium and aluminium oxides and alkali metals, alkaline earth metals, and their derivatives and certain other compounds are excluded. It is explained that iron, nickel and copper phthalocyanines are not disrupted by strong sulphuric acid, but that other metal phthalocyanines are disrupted when so treated, and thus give metal-free phthalocyanine, referred to above, the use of which as a pigment is claimed. The process of heating metal-free phthalocyanine with a metal, preferably in a high-boiling organic liquid, is described and claimed. These processes are illustrated by a description of the behaviour of o-cyanobenzamide and a dichloro-o-cyanobenzamide made from 3:4-dichlorophthalic anhydride.

In British Patent No. 410,814 a process for making metal and metal-free phthalocyanines from o-arylene dicyanide of the benzene or naphthalene series is described, with particular mention of metals or compounds thereof listed as follows, namely, aluminium, antimony, barium, calcium, cobalt, copper, magnesium, molybdenum, nickel, potassium, tin, and zinc. It is described how purification may be effected by dissolving in concentrated sulphuric acid and precipitating by dilution and it is described or implied that this treatment effects only a purification when the copper phthalocyanine is in question, whereas with some other metal phthalocyanines it also causes a decomposition, so that metal-free phthalocyanine is obtained. Linstead (Journal and Proceedings of the Institute of Chemistry of Great Britain and Ireland, 1935, part II, page 178) has said that the metallic derivatives at that time investigated fell into two general classes, (a) those of the more electronegative metals, which are precipitated unchanged when their solutions in sulphuric acid are poured into water; (b) those of the more electropositive metals which by this treatment lose their metal to yield a metal-free parent compound. In British Patent No. 410,814 it is further described and claimed how the coloring matters described may be employed as pigments, before or after conversion into lakes with the usual substrata, whereby they are made suitable for use in varnishes and inks.

The above may be conveniently epitomised by saying that phthalocyanine itself $(C_8H_4N_2)_4.H_2$, and certain metal phthalocyanines of general formula $(C_8H_4N_2)_4.Me$ (where Me stands for metal) are useful as coloring matters, especially as pigments, whilst certain metal phthalocyanines are also useful as intermediates for the production of phthalocyanine itself. Certain corresponding nuclear-substituted phthalocyanines, namely, those from the corresponding phthalic derivatives substituted as follows:

4-chloro (see British Patents Nos. 390,149 and 410,814),
3:4-dichloro (see British Patents Nos. 389,842 and 390,149),
3:6-dichloro (see British Patent No. 390,149)
3-nitro (see British Patent No. 410,814)
4-nitro (see British Patents Nos. 390,149 and 410,814) and
5:6-benz- (i. e., the naphthalene analogue, see British Patent No. 410,814) have also been described.

It is further to be remarked that when certain copper halides are used in suitable proportions in making copper phthalocyanines, as from phthalonitrile, then some substitution of hydrogen by halogen in one or more phenylene groups takes place simultaneously with the formation of the phthalocyanine molecule. This circumstance alone renders it necessary to regard the term copper phthalocyanine as a generic term, applicable not only to a pure compound, but also to mixtures which may be obtained according as the proportions of reagents vary or the temperature or other reaction conditions are altered. Such mixtures are as useful as pigments as pure compounds, and may be even more useful, as small differences in hue, especially in blue or green pigments, often have great technical importance. For these reasons it is intended that the terminology used in the description of the invention described below shall be construed so that descriptions of products shall not be taken as implying that the products obtained are necessarily individual chemical compounds.

The present invention relates to a process whereby certain metal phthalocyanines are obtained from readily accessible starting materials.

The invention is directed primarily to obviating the complexities of earlier processes in respect of supply of starting materials. Thus, the 0-cyanoarylcarboxylic amides of British Patent 389,842 are made, for instance, from the corresponding phthalimides, themselves made from the corresponding phthalic anhydride conveniently, at least in the laboratory, by heating that, under known, specified, conditions with urea. Similarly some of the dicyano compounds used in British Patent No. 410,814 may themselves be the products of laborious synthetic processes.

The invention is based on the discovery that copper phthalocyanines may be readily made by heating a phthalic anhydride with urea and a copper-yielding substance.

It will be understood however that the necessary intermediates for some phthalocyanines may be more easily accessible than the particular phthalic anhydride that would be needed. Hence the scope of the invention is not limited to the use of phthalic anhydrides as starting materials. The invention has also particular technical advantages in respect of manipulative features. Thus, the reaction mixture is easily manipulated, being fluid at a time when reaction is actively proceeding: the temperature of the reaction mixture is easily controlled. (It should be noted here that the reaction between phthalonitrile and metallic copper or cupric chloride is highly exothermic.) It should also be said that the crude products of the reaction are readily purified. It should also be noted that the process of the present invention has technical advantages in respect both of yield and quality of product over the process of British Patent No. 322,169.

According to the invention stable metal phthalocyanines, and in particular, aluminium, chromium, cobalt, copper, iron, and nickel phthalocyanines are made by heating together a phthalic anhydride (the term includes also the anhydrides of naphthalene- 1,2- and -2,3-dicarboxylic acids) or the corresponding free acid, or a mono ether, e. g. an alkyl ether thereof, or an ammonium salt thereof, or a mono or di-amide, or imide of the said acid, or an ortho-cyano-benzoic acid or an ammonium salt or ester thereof, with urea or a heat-decomposition product thereof and a substance consisting of or containing the metal in question, preferably the free metal or a salt thereof.

When the reagents are heated together a fused mass is formed and at a temperature of about 200° C. the mass begins to turn green, a metal phthalocyanine being formed. The mass is conveniently stirred to keep it homogeneous. The metal or metal compound used may, not, of course, dissolve. The temperature is kept at about 200–220° C. until no more coloring matter is formed, the mass becoming more and more pasty or eventually solid. It is convenient, indeed necessary, to use some excess of urea, as is described in greater detail below. Some ammonia may be evolved. It may be noted here that the generation of ammonia appears to be not directly related to pigment formation, as the yield is not increased by passing gaseous ammonia into the mother mixture, or by adding ammonium carbonate to the reaction mixture.

When free metal is used the temperature of reaction is somewhat higher than 200–220° C. and may be as high as 290° C.

The interaction may be caused to take place by stages. Thus it has been found that the product obtained by heating phthalic anhydride and an excess of urea together to 200–210° C. in the absence of a metal gives, when itself heated with cupric chloride a good yield of a copper phthalocyanine. The invention accordingly includes the heating with a metal yielding substance of a phthaluric acid (see Piutti, Liebig's Annalen der Chemie, 1882, 214, 17) or a substance obtained by heat decomposition thereof. The invention also includes, as indicated above, a similar treatment of a phthalimimide, i. e. a compound of the formula typified by that of phthalimimide (also known as iminophthalimidine) itself, viz.:

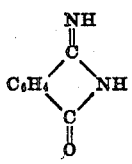

which has in fact been found to be extractable from the molten mixture described above (or see Example 3).

But, for reasons given, the preferred form of the invention is to heat a phthalic anhydride with an excess of urea and a salt of a metal adapted to give a stable metal phthalocyanine as described.

It is to be noted that an aluminium phthalocyanine cannot be obtained when the starting material is o-cyano-benzamide (cf. British Patent No. 389,842). With phthalonitrile and aluminium chloride an aluminium phthalocyanine is obtained (British Patent No. 410,814). In the process of the present invention the metals described show individual characteristics, and the applicability of the process for technical purposes depends to some extent on these differences in properties amongst themselves of the metals mentioned. For this reason a large number of illustrative examples is given below.

In carrying the invention into practical effect it is, as already said, sufficient usually to mix the reagents, to apply heat, stir when the mixture is fluid, and then raise the temperature until pigment begins to be formed. Then to continue to heat or at least to keep hot until pigment formation ceases. The mass is then cooled, ground, suitably washed to remove excess of reagents if any, and purified or treated further as has been described in the British patents cited above.

The yield, it should be said, is not generally in accordance with theory when reckoned on either organic reagent but is sufficient to justify the remarks made above as to technical advantage. The yield may depend on the order in which the reagents are brought together, and is usually improved by melting first the phthalic anhydride, then adding the metal salt, and finally adding the urea.

It is usually convenient, but not always necessary, to add the metal salt in the anhydrous form; then, either hydrated cupric chloride ($CuCl_2.2H_2O$) or the anhydrous salt (Bödkker, Zeitschrift für physikalische chemie, 1897, 22, 506) will serve equally well.

The yield may be improved in certain circumstances by carrying out the operation in a closed vessel so that pressure is generated. It may also be improved by adding as an additional reagent sulphaminic acid or imido-disulphonic acid or nitrilo-trisulphonic acid, or a salt of any of these (as referred to in the specification of co-pending application Serial No. 82,147, filed May 27, 1936.

The yield may also be improved by adding boric acid. Also when boric acid is present there is less tendency for frothing to be objectionable. Boric acid appears to have a specific effect; it is not necessary to use so much boric acid as would suffice to give the known boron phthalate (see Berichte der deutsche Chem. Gesellschaft, 36, 2225).

As substituted phthalic compounds (besides the naphthalene dicarboxylic acids mentioned) there are to be mentioned the mono-, di-, and tri-halogenophthalic acids and their derivatives, the nitro-phthalic acids and their derivatives, the benzene-tri- and tetra-carboxylic acids, e. g. hemimellitic, trimellitic, and pyromellitic acids. In connection with these it is to be noted that the process of the invention permits of the production of phthalocyanines from compounds not readily to be transformed into intermediate compounds suitable for use in the earlier processes. When trimellitic acid is used in the making of a copper phthalocyanine according to the present invention, a tetracarboxy compound appears to be formed.

It will be understood that mixtures of the various phthalic derivatives may be used if necessary to give particular shades of color. For instance, a mixture of phthalic anhydride and 3,6-dichloro or 4,5-dichlorophthalic anhydride may be used. In this way copper phthalocyanines may be made which have a useful green shade.

It is convenient to note here that an illustrative typical equation for the process of the invention could be written as follows:

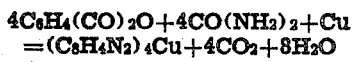

But it is not possible to use an amount of urea to correspond with this equation. Molecular equivalent proportions of urea and phthalic anhydride when heated together give phthalimide (cf. Piutti, loc. cit.), a reaction referred to indeed in the prior British specifications cited above. Some excess of urea is needed to give a mixture of suitable consistency for manipulation and indeed, in this respect, a large excess is advantageous. The urea, in fact, behaves as a reagent and as a flux.

As copper-yielding substances it is preferable to use copper salts, and more specifically the halides. Even amongst the halides there are differences in behaviour, and under similar circumstances cupric chloride gives a better yield than cuprous chloride. Neubauer and Kerner (Liebig's Annalen der Chemie, 1857, 101, page 340) describe some compounds of copper salts with urea. Naturally these also may be used in our invention.

Similar remarks in respect of choice of metal-yielding substance may be made for other metals. The halides, and more specifically, the chlorides are preferred. There is even some evidence to suggest that the presence of halogen ions is a controlling factor.

The invention is illustrated but not limited by the following examples in which the parts are by weight.

*Example 1*

74 parts of phthalic anhydride, 74 parts of urea and 16.7 parts of aluminium chloride are mixed and heated. The mixture is stirred when it has fused. When the temperature reaches 210° C. the mixture rapidly becomes colored.

The powdered melt is extracted with hot dilute aqueous caustic soda and then with hot dilute aqueous hydrochloric acid. 40 parts of a green microcrystalline powder is obtained, which after being dissolved in sulphuric acid and precipitated with water, filtered off, washed, and dried if necessary, is in suitably finely divided condition for use as a pigment. It gives very bright bluish green shades.

Instead of 74 parts of phthalic anhydride, 74 parts of o-cyanobenzoic acid or 81 parts of its methyl ester or 97 parts of the monoethyl ester of phthalic acid may be used.

Instead of 16.7 parts of aluminium chloride 20.3 parts of anhydrous ferric chloride may be used to give the compound described in Example 4 below.

Example 2

74 parts of phthalic anhydride, 74 parts of urea, and 13.6 parts of chromium fluoride ($CrF_3$) are treated as described in Example 1. 35 parts of an olive colored powder is obtained, which used as a pigment gives an olive shade.

In place of chromium fluoride, chromium chloride ($CrCl_3$) as commercial hydrate may be used.

Further examples are shown in the following table. In these the amounts of phthalic anhydride, and urea, and the temperatures and times of heating are as given in Example 1, and only the salt used differs, the quantities thereof being those chemically equivalent, in respect of metal, to one another.

| Example | Salt used | Color of product |
|---|---|---|
| 3 | Cobaltous chloride | Blue. |
| 4 | Ferrous chloride | Dark green. |

These two compounds are cobalt and iron phthalocyanines. Cobalt phthalocyanine is described in British Patent No. 389,842.

Example 5

18 parts of phthalic anhydride, 18 parts of urea and 4 parts of anhydrous cupric chloride are heated together with stirring at about 200–220° C. for about one hour. After cooling, the melt is ground up, extracted with boiling water, and filtered. The resulting product is crude copper phthalocyanine in good yield.

Example 6

140 parts of diammonium phthalate, 100 parts of urea, and 20 parts of anhydrous cupric chloride are mixed and heated in an open vessel provided with a stirrer at 160–220° C. for 4 hours. Some ammonia is evolved and the originally pasty mass becomes dark blue and solid. The mass is cooled, ground, and washed with hot dilute aqueous caustic soda, then with hot dilute aqueous hydrochloric acid. The pigment so-obtained is not finely divided enough for use, and is accordingly dissolved in about eight times its weight of sulphuric acid (sp. gr. 1.84). The solution is poured into water (about enough to give eventually 5% sulphuric acid). The diluted suspension is filtered, and the paste washed with water. This paste is preserved for use or dried according as an aqueous pigment paste or a dry powder suitable for mixing with nonaqueous substances is desired.

The yield of pigment is about 50% of the theoretical, reckoned on the di-ammonium phthalate used.

In place of the 100 parts of urea used above there may be used, to give similar results, 60 parts of the substance obtained by heating urea itself at 200° C. for 1 hour. The material is when ground a white, amorphous powder, which contains, but does not entirely consist of, biuret.

Example 7

7.5 parts of urea are heated to 140° C., 7.5 parts of o-cyano benzoic acid are added, the mixture is heated to 170° C. and then 1.5 parts of anhydrous cupric chloride are added. The temperature is raised to 230–240° C. and kept there for ½ hour. The mass is cooled, and ground to a powder. The powder is stirred with hot dilute aqueous caustic soda, filtered off, similarly treated with hot dilute aqueous hydrochloric acid, filtered, washed with water and dried. Copper phthalocyanine in good yield is obtained. Instead of the 7.5 parts of o-cyanobenzoic acid there may be used 8.1 parts of the methyl ester of o-cyanobenzoic acid or 9.7 parts of the monoethyl ester of phthalic acid.

Example 8

80 parts of phthalic di-amide, 72 parts of urea, and 16 parts of anhydrous cupric chloride are mixed, heated at 160–220° C. and otherwise treated as in Example 5. Copper phthalocyanine is similarly obtained in good yield.

In place of the 80 parts of phthalic di-amide used in the above examples, 72 parts of phthalimide may be used, and in place of cupric chloride corresponding amounts of cuprous chloride or finely powdered copper bronze may be used, all with similar results. When cupric chloride is used there is some nuclear halogenation, to give copper chlorophthalocyanine, as explained above. When metallic copper, in the form of copper bronze, is used the temperature must be higher to give a good yield, i. e., it must rise to above 260° C.

Example 9

This example is of the use of a closed vessel.

109 parts of phthalimide, 67 parts of urea, 25 parts of anhydrous cupric chloride are mixed and heated at about 200–220° C. in an autoclave. The product is worked up as described in Example 5. The yield of pigment is 70% reckoned on the phthalimide used.

Other examples of the production of copper phthalo cyanines are given in the following table, the quantities and procedure being those of the Example 5 except that the corresponding amounts of the various substituted phthalic anhydrides are used:—

| Example No. | Starting out compound | Color of product |
|---|---|---|
| 10 | 4-chlorophthalic anhydride | Greenish-blue. |
| 11 | 3,6-dichlorophthalic anhydride | Blue-green. |
| 12 | 4,5-dichlorophthalic anhydride | Blue-green. |

The products of Examples 11 and 12 are, as will have been seen, new compounds.

Example 13

In this example the improved yield obtained by using ammonium sulphamate as adjuvant is shown. 60 parts of urea, 120 parts of ammonium sulphamate, are mixed and heated to 100° C. and a mixture of 100 parts of phthalic anhydride and 20 parts of anhydrous cupric chloride is fed in to the stirred hot molten mass. When all is in the temperature is raised gradually to 220° C. and kept so till no more pigment is formed. The cooled mixture is then crushed, washed, etc. as described in Example 5. The yield of copper phthalocyanine is 80% of the theoretical, reckoned on the phthalic anhydride.

Example 14

A mixture of 5.7 parts of anhydrous cupric chloride and 27.5 parts of urea is heated to 160° C. To the molten mass, which is kept stirred, is added a mixture of 18.5 parts of phthalic anhydride and 9 parts of 3:6-dichloro phthalic anhydride. The addition takes 15 mins. and the temperature is raised to 220° C. during this period. The temperature is then raised to 220–240° C. and kept there for 2 hours.

The mixture is then cooled, crushed, and boiled up with water. It is then filtered, washed again by boiling first with dilute aqueous caustic soda, and then with dilute aqueous hydrochloric acid. It is then washed again with water and dried.

The so-obtained compound gives, when applied as a pigment in lithographic ink, a green shade.

*Example 15*

50 parts of hemimellitic acid, 100 parts of urea, 5 parts of boric acid and 8 parts of anhydrous cupric chloride are ground together and the mixture heated gradually to 240° C. when the melt is removed from the containing vessel, ground and baked at 300° C. until no more pigment is produced. The bake is then ground and extracted with 1000 parts of water containing enough sodium hydroxide to keep the mixture alkaline, the solid matter filtered off, dried and dissolved in 10 times its weight of concentrated sulphuric acid, poured into water, filtered, washed with water until neutral and dried. The dry product is a bluish-green crystalline powder, which is slightly soluble in weak ammonia.

A similar product is obtained when instead of hemimellitic acid trimellitic acid is used.

*Example 16*

130 parts of urea, 5 parts of boric acid, are melted together with stirring. When the temperature reaches 150° C. a mixture of 100 parts of phthalic anhydride and 20 parts of cupric chloride (anhydrous) is added. The mass is then heated to 200° C. till formation of coloring matter is complete. It is then cooled and worked up as described in Example 6. The yield of copper phthalocyanine is 65 parts.

*Example 17*

A mixture of 59 parts of urea and 13 parts of anhydrous nickelous chloride is heated with stirring to 170° C. To the molten mass, 59 parts of phthalic anhydride are added in portions during ½ hr. with stirring. During the addition the temperature is raised to 210° C. It is then raised to 220–230° C. and kept there for 3 hours. The mass is then cooled, ground and washed successively with hot water, hot dilute aqueous hydrochloric acid and hot dilute aqueous caustic soda. It is then washed again with water and dried. Nickel phthalocyanine is obtained in good yield.

*Example 18*

A mixture of 15 parts of 3,6-dichlorophthalic anhydride and 15 parts of urea is heated with stirring to 150° C. A mixture of 3.5 parts of anhydrous nickel chloride and 15 parts of urea is then added with stirring over 10 minutes, during which time the temperature is raised to 210° C. When the addition is complete, the temperature is raised to 240–250° C. and kept there for 5 hours.

The mass is cooled, crushed, and boiled with dilute aqueous hydrochloric acid and then with dilute aqueous caustic soda. The coloring matter obtained is then dried at 100° C. This is a new compound, being a nickel octachlorophthalocyanine. It has a bluish green color.

It will be clear from the above description and detailed examples, that my invention provides an improved process for the manufacture of metal phthalocyanines by using initial material which is relatively more accessible, and therefore more economical, than ortho-arylene dinitriles. The dinitrile of phthalic acid, for instance, is in general practice prepared from phthalic anhydride or phthalimide. In my present invention, however, these initial materials themselves may be employed, with great efficiency, for the production of phthalocyanine coloring matters. My invention thus simplifies the process of color formation, and increases its economy.

Nevertheless, my invention is not limited to the use of these particular initial materials, but may be applied to other related initial materials, which may in certain special cases be more economically available. My invention therefore has the additional advantage of being general, or in any event more general than the process of British Patent No. 322,169, which employs gaseous ammonia or an arylamine instead of urea.

It will be further observed that the various initial materials which I found suitable for my improved process, and of which I gave numerous illustrations hereinabove, are all related in a special manner and form a natural group of substances. This relationship can best be understood by considering diammonium phthalate as the progenitor of a series of phthalic derivatives which are based on the benzene nucleus. It will observed that all the other members of this series mentioned in the description hereinabove, for instance phthalic acid, phthalic anhydride, phthalimide, phthalamide, ortho-cyanobenzoic acid, and phthalimimide, possess the same arylene nucleus as the progenitor, and the same type of ortho-substitution, except that they differ from the progenitor by integral numbers of $H_2O$ units and $NH_3$ units. Thus, phthalic anhydride=diammonium phthalate minus $2NH_3$ and $1H_2O$;
phthalimide=diammonium phthalate minus $1NH_3$ and $2H_2O$;
phthalimimide=diammonium phthalate minus $3H_2O$;
ortho-cyano-benzoic acid=diammonium phthalate minus $1NH_3$ and $2H_2O$.

Although in actual practice some of the individual compounds mentioned may not be actually derived or derivable from the progenitor by the elimination of water and ammonia, it is nevertheless convenient for the purpose of classification to regard the entire series of compounds as decomposition products of diammonium phthalate, which decomposition involves the elimination of $NH_3$ units and $H_2O$ units only. The unity of the entire group of substances thus included seems, however, to go much beyond the mere convenience of classification; for as illustrated by the above series of examples, the members of this group actually do behave very much alike in the chemical synthesis under discussion. The group therefore possesses a natural unity.

Now, it will be clear from my disclosure hereinabove that my invention is applicable to the group of compounds comprising diammonium phthalate and its decomposition products; to the groups similarly derivable from the diammonium ortho-carboxylates of the naphthalene and anthracene series; to nuclear substitution derivatives of the individual member of these groups, especially nitro, halogen and carboxy; and, finally, to the mono-alkyl esters of such members of the above groups as still possess at least one esterifiable carboxy group.

I claim:
1. The process of producing a metal-phthalocyanine coloring matter, which comprises heat- ing together urea, a metalliferous reagent capable of supplying a metal selected from the group consisting of iron, nickel, cobalt, aluminum, chromium and copper, and an ortho-arylene derivative selected from the group consisting of ortho-arylene anhydrides, the corresponding free acids, ammonium salts of said acids, monoamides of said acids, diamides of said acids, the imides and imimides of said acids, the ortho-arylene-cyano-carboxylic acids, and ammonium salts of the latter.

2. A process as in claim 1, the reaction being carried out in the further presence of boric acid.

3. The process of producing a copper-phthalocyanine coloring matter, which comprises heating together urea, a copper-yielding reagent, and an ortho-arylene derivative selected from the group consisting of ortho-arylene anhydrides, the corresponding free acids, ammonium salts of said acids, monoamides of said acids, diamides of said acids, the imides and imimides of said acids, the ortho-arylene-cyano-carboxylic acids, and ammonium salts of the latter.

4. A process as in claim 3, the reaction being carried out in the further presence of boric acid.

5. A process for producing coloring matter of the metal-phthalocyanine series, which comprises heating an ortho-phthalic anhydride and urea to a temperature between 160° and 290° C. in the presence of a substance capable of yielding a metal selected from the group consisting of iron, nickel, cobalt, aluminum, chromium and copper, under the conditions of the reaction.

6. A process for producing coloring matter of the metal-phthalocyanine series, which comprises heating an ortho-phthalimide and urea to a temperature between 160° and 290° C. in the presence of a substance capable of yielding a metal selected from the group consisting of iron, nickel, cobalt, aluminum, chromium and copper, under the conditions of the reaction.

7. The process which comprises heating phthalic anhydride to a temperature between 200° and 260° C., with an excess over equimolecular proportions of urea and about ¼ molecular proportion of a copper-yielding reagent, and recovering the coloring matter thus obtained.

8. A process as in claim 7, the reaction being carried out in the further presence of boric acid.

9. The process which comprises heating phthalimide to a temperature between 200° and 260° C., with an excess over equimolecular proportions of urea and about ¼ molecular proportion of a copper-yielding reagent, and recovering the coloring matter thus obtained.

10. A process for producing coloring matter of the metal-phthalocyanine series, which comprises heating urea and a nuclear halogen derivative of phthalic anhydride to a temperature between 200° and 260° C. in the presence of a substance capable of yielding a metal selected from the group consisting of iron, nickel, cobalt, aluminum, chromium and copper, under the conditions of the reaction.

11. A process for producing coloring matter of the metal-phthalocyanine series, which comprises heating 3,6-dichloro-phthalic anhydride and urea to a temperature between 200° and 260° C. in the presence of a substance capable of yielding a metal selected from the group consisting of iron, nickel, cobalt, aluminum, chromium and copper, under the conditions of the reaction.

MAX WYLER.